US012717824B2

(12) United States Patent
Tanaka et al.

(10) Patent No.: US 12,717,824 B2
(45) Date of Patent: Aug. 25, 2026

(54) ARTIFICIAL INTELLIGENCE APPARATUS AND CHEMICAL MATERIAL SEARCH METHOD THEREOF

(71) Applicants: LG ELECTRONICS INC., Seoul (KR); TOHOKU UNIVERSITY, Miyagi (JP)

(72) Inventors: Takuro Tanaka, Kanagawa (JP); Masami Sako, Kanagawa (JP); Hyunchul Lee, Seoul (KR); Hyukgeun Cha, Seoul (KR); Dongho Kim, Seoul (KR); Masayuki Ohzeki, Miyagi (JP)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/998,586

(22) PCT Filed: Jul. 24, 2023

(86) PCT No.: PCT/KR2023/010660
§ 371 (c)(1),
(2) Date: Jan. 27, 2025

(87) PCT Pub. No.: WO2024/025281
PCT Pub. Date: Feb. 1, 2024

(65) Prior Publication Data

US 2026/0044544 A1 Feb. 12, 2026

Related U.S. Application Data

(60) Provisional application No. 63/392,129, filed on Jul. 26, 2022.

(51) Int. Cl.
*G06F 16/3331* (2025.01)
*G06F 16/242* (2019.01)

(52) U.S. Cl.
CPC ........ *G06F 16/3331* (2019.01); *G06F 16/244* (2019.01)

(58) Field of Classification Search
None
See application file for complete search history.

(56) References Cited

U.S. PATENT DOCUMENTS

| | | | |
|---|---|---|---|
| 7,672,791 | B2 | 3/2010 | Horn et al. |
| 2004/0254735 | A1 | 12/2004 | Horn et al. |

(Continued)

FOREIGN PATENT DOCUMENTS

| | | |
|---|---|---|
| CN | 112086146 | 12/2020 |
| KR | 10-2020-0051019 | 5/2020 |
| WO | 2022-081889 | 4/2022 |

OTHER PUBLICATIONS

PCT International Application No. PCT/KR2023/010660, International Search Report dated Oct. 24, 2023, 5 pages.

(Continued)

*Primary Examiner* — Son T Hoang
(74) *Attorney, Agent, or Firm* — LEE, HONG, DEGERMAN, KANG & WAIMEY

(57) ABSTRACT

An apparatus and system for efficiently searching for a chemical material satisfying desired characteristics by means of an annealing-based quantum computing device, the apparatus including a database that stores datasets of a chemical material, and a processor that searches for a target material from the database, and the processor may predict fingerprints relating to target characteristics by inputting fingerprints of the datasets into a pre-trained neural network model, extract sample data by optimizing the fingerprints relating to target characteristics, evaluate feature importance from the extracted sample data, select high-level features on (Continued)

the basis of the feature importance, and search for a target material on the basis of the selected high-level features.

11 Claims, 13 Drawing Sheets

(56) References Cited

U.S. PATENT DOCUMENTS

| | | | | |
|---|---|---|---|---|
| 2017/0213155 | A1* | 7/2017 | Hammond | G06F 16/951 |
| 2018/0150785 | A1* | 5/2018 | Wang | G06F 16/95 |
| 2020/0303071 | A1* | 9/2020 | Miller | G06F 16/25 |
| 2020/0349451 | A1 | 11/2020 | Suzuki et al. | |
| 2021/0110240 | A1* | 4/2021 | Hara | G06F 16/903 |
| 2021/0248186 | A1* | 8/2021 | Miyazawa | G06F 16/2453 |
| 2021/0264110 | A1* | 8/2021 | McCarthy | G06F 16/2246 |
| 2021/0398621 | A1 | 12/2021 | Stojevic et al. | |
| 2022/0130493 | A1 | 4/2022 | Turner et al. | |
| 2022/0215899 | A1* | 7/2022 | Wang | G06F 16/90 |
| 2024/0020320 | A1* | 1/2024 | Kumar | G06F 16/285 |
| 2025/0190454 | A1* | 6/2025 | Patil | G06F 16/3326 |

OTHER PUBLICATIONS

Schmidt et al., "Recent advances and applications of machine learning in solid-state materials science," npj Computational Materials, 2019, vol. 5, article No. 83, 36 pages.

Tanaka et al., "Virtual Screening of Chemical Space Based on Quantum Annealing," Journal of the Physical Society of Japan 92, 023001 (2023), 4 pages.

Snelling et al., "A Quantum-Inspired Approach to De-Novo Drug Design," 14 pages.

Hatakeyama-Sato et al., "Tackling the challenge of a huge materials science search space with quantum-inspired annealing," 43 pages.

Jimenez-Guardeno et al., "Drug repurposing based on a Quantum-Inspired method versus classical fingerprinting uncovers potential antivirals against SARS-CoV-2 including vitamin B12," Aug. 2021, 40 pages.

* cited by examiner

ARTIFICIAL INTELLIGENCE APPARATUS AND CHEMICAL MATERIAL SEARCH METHOD THEREOF

CROSS-REFERENCE TO RELATED APPLICATIONS

This application is the National Stage filing under 35 U.S.C. 371 of International Application No. PCT/KR2023/010660, filed on Jul. 24, 2023, which claims the benefit of U.S. Provisional Application No. 63/392,129 filed on Jul. 26, 2022, the contents of which are all hereby incorporated by reference herein in their entireties.

TECHNICAL FIELD

The present disclosure relates to an artificial intelligence apparatus and a chemical material search method, which efficiently search for chemical materials that satisfy desired characteristics using an annealing-based quantum computing device.

BACKGROUND ART

In general, Artificial intelligence is a field of computer engineering and information technology that research a method for allowing computers to do thinking, learning, self-development or the like that can be done by human intelligence, and means that computers is allowed to imitate human intelligent behavior.

In addition, artificial intelligence does not exist by itself, but is directly or indirectly related to other fields of computer science. Especially, artificial intelligent factors has been introduced in the various field of information technology, and it has been actively attempted to utilize them to solve problems in the field.

On the other hand, techniques for perceiving and learning surrounding environment using artificial intelligence, providing information desired by a user in a desired form, or performing an operation or function desired by the user are being actively studied.

An electronic device providing such various operations and functions may be referred to as an artificial intelligence (AI) apparatus.

Recently, with the increasing demand for the high functionality and diversification of chemical materials, the development of new chemical materials with unprecedented properties and functions has become necessary.

However, the properties of chemical materials rely on numerous microscopic factors, necessitating the examination of vast combinations within the chemical space.

Due to these factors, the development of new chemical materials has traditionally required significant time and effort, posing considerable challenges in identifying optimal solutions.

Recently, methods employing algorithms capable of exploring chemical materials that meet desired characteristics have been developed to shorten the development time.

However, while such methods allow for the interpretation of molecules using algorithms, there is still the problem that it takes a considerable amount of time to search for target chemical materials.

Therefore, in the future, it will be essential to develop artificial intelligence technologies capable of efficiently and rapidly searching for chemical materials satisfying desired characteristics in minimal time by reducing the chemical space based on the feature importance of material characteristics.

DISCLOSURE OF INVENTION

Technical Problem

The present disclosure aims to solve the above problems and other problems.

An object of the present disclosure is to provide an artificial intelligence device and a chemical material search method, which extract sample data using quantum annealing and reduce the chemical space based on the feature importance of material characteristics to quickly and efficiently search for chemical material satisfying a desired characteristic in a minimum amount of time.

Technical Solution

According to an embodiment, an artificial intelligence apparatus includes a database configured to store datasets of chemical materials, and a processor configured to search for a target material from the database, and the processor may predict a fingerprint relating to a target characteristic by inputting fingerprints of the datasets into a pre-trained neural network model, extract sample data by optimizing the fingerprint relating to the target characteristic, evaluate a feature importance from the extracted sample data, select high-level features based on the feature importance, and search for the target material based on the selected high-level features.

According to an embodiment, a method of searching a chemical material in an artificial intelligence apparatus includes converting datasets of chemical materials into fingerprints, predicting a fingerprint relating to a target characteristic by inputting fingerprints of the datasets into a pre-trained neural network model, extracting sample data by optimizing the fingerprint relating to the target characteristic, evaluating a feature importance from the extracted sample data, selecting high-level features based on the feature importance, and searching for the target material based on the selected high-level features.

Advantageous Effects

According to the embodiments of the present disclosure, it is possible to quickly and efficiently search for chemical material that meets a desired characteristic in a minimum amount of time by extracting sample data using quantum annealing and reducing the chemical space based on the feature importance of material characteristics.

BEST MODE FOR CARRYING OUT THE INVENTION

Figure 1:
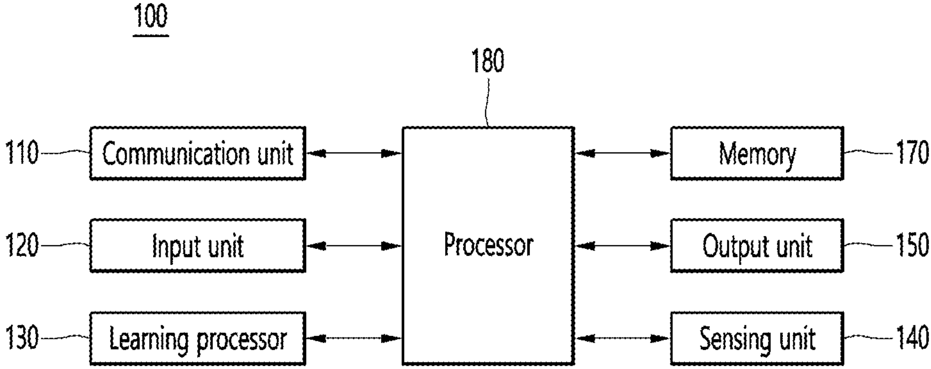
FIG. 1 illustrates an artificial intelligence apparatus according to an embodiment of the present disclosure.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the disclosure in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

Also, throughout this specification, a neural network and a network function may be used interchangeably. The neural network may be constituted by a set of interconnected computational units, which may be generally referred to as "nodes". These "nodes" may also be referred to as "neurons". The neural network is configured to include at least two or more nodes. Nodes (or neurons) constituting neural networks may be interconnected by one or more "links".

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of training an artificial neural network in a state in which a label for learning data is given, and the label may mean the correct answer (or result value) that the artificial neural network must infer when the learning data is input to the artificial neural network. The unsupervised learning may refer to a method of training an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

In this case, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are illustrated together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 illustrates an AI device 100 according to an embodiment of the present disclosure.

The AI device (or an AI apparatus) 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100*a* to 100*e* and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

In this case, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used if an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

Figure 2:
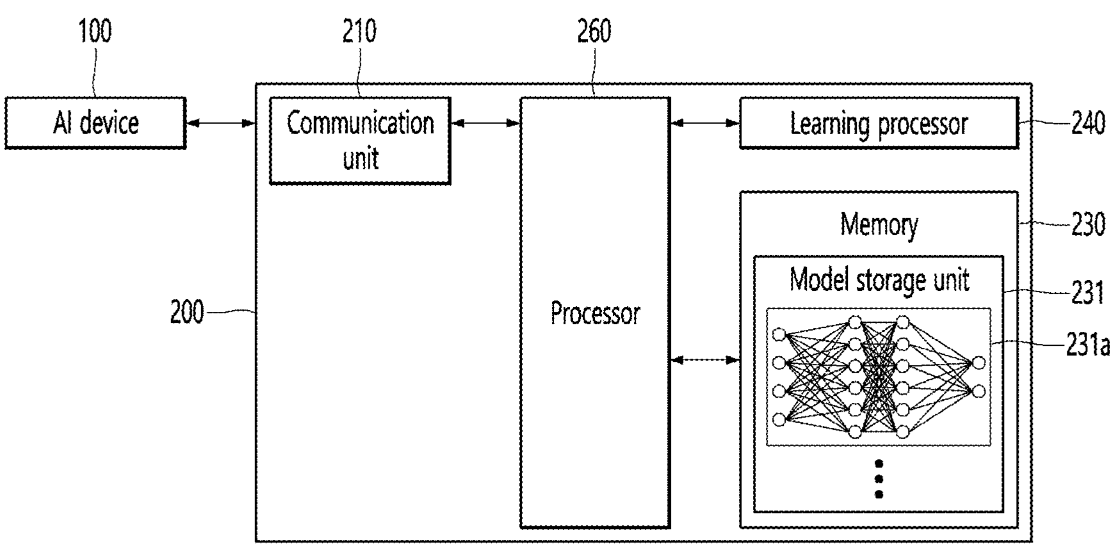
FIG. 2 illustrates an artificial intelligence server according to an embodiment of the present disclosure.

At this time, the learning processor 130 may perform AI processing together with the learning processor 240 of the AI server 200 of FIG. 2.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may include a quantum processor (QPU) that executes a multidimensional quantum algorithm using qubits.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in the memory 170. Furthermore, the processor 180 may operate two or more of the components included in the AI device 100 in combination so as to drive the application program.

FIG. 2 illustrates an AI server 200 according to an embodiment of the present disclosure.

Referring to FIG. 2, the AI server 200 may refer to a device that learns an artificial neural network by using a machine learning algorithm or uses a learned artificial neural network/The AI server 200 may include a plurality of servers to perform distributed processing or may be defined as a 5G network. In this case, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 may transmit and receive data to and from an external device such as the AI device 100.

The memory 230 may include a model storage unit 231. The model storage unit 231 may store a learning or learned model (or an artificial neural network 231*a*) through the learning processor 240.

The learning processor 240 may learn the artificial neural network 231*a* by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 180 may include a quantum processor (QPU) that executes a multidimensional quantum algorithm using qubits.

The processor 260 may infer the result value for new input data by using the learning model and may generate a response or a control command based on the inferred result value.

Figure 3:
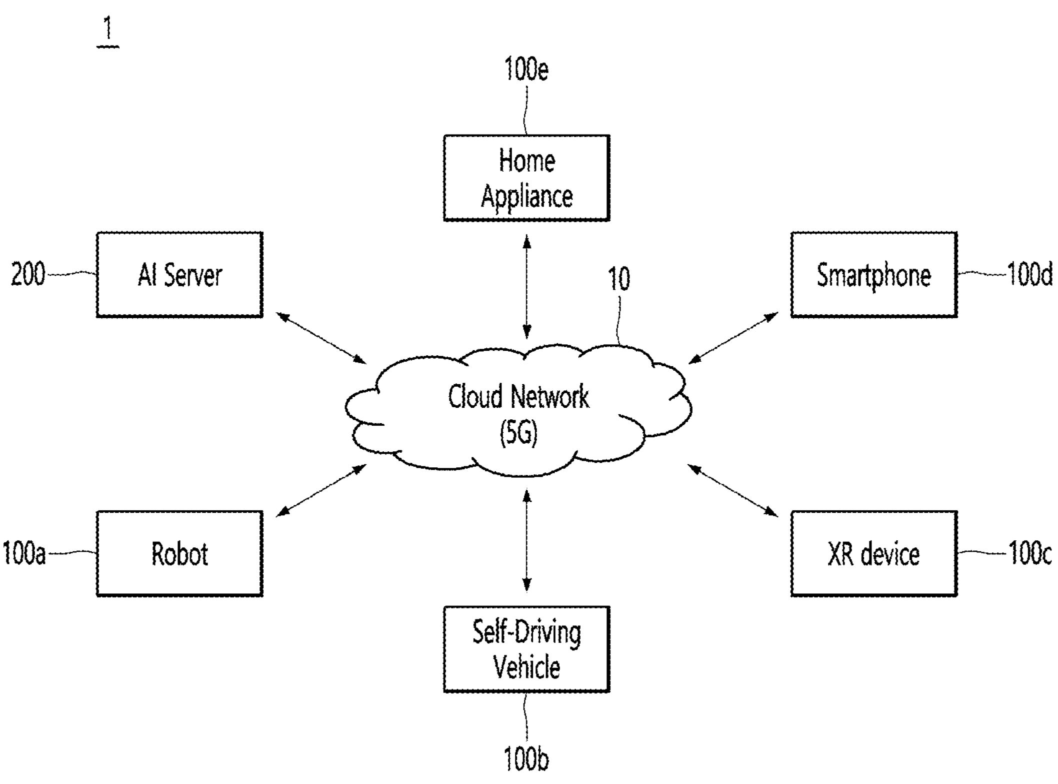
FIG. 3 illustrates an artificial intelligence system according to an embodiment of the present disclosure.

FIG. 3 is a view of an AI system 1 according to an embodiment of the present invention.

Referring to FIG. 3, in the AI system 1, at least one of an AI server 200, a robot 100*a*, a self-driving vehicle 100*b*, an XR device 100*c*, a smartphone 100*d*, or a home appliance 100*e* is connected to a cloud network 10. The robot 100*a*, the self-driving vehicle 100*b*, the XR device 100*c*, the smartphone 100*d*, or the home appliance 100*e*, to which the AI technology is applied, may be referred to as AI devices 100*a* to 100*e*.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100*a* to 100*e* and 200 configuring the AI system 1 may be connected to each other through the cloud network 10. In particular, each of the devices 100*a* to 100*e* and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100*a*, the self-driving vehicle 100*b*, the XR device 100*c*, the smartphone 100*d*, or the home appliance 100*e* through the cloud network 10, and may assist at least part of AI processing of the connected AI devices 100*a* to 100*e*.

At this time, the AI server 200 may learn the artificial neural network according to the machine learning algorithm instead of the AI devices 100*a* to 100*e*, and may directly store the learning model or transmit the learning model to the AI devices 100*a* to 100*e*.

At this time, the AI server 200 may receive input data from the AI devices 100*a* to 100*e*, may infer the result value for the accommodated input data by using the learning model, may generate a response or a control command based on the inferred result value, and may transmit the response or the control command to the AI devices 100*a* to 100*e*.

Alternatively, the AI devices 100*a* to 100*e* may infer the result value for the input data by directly using the learning model, and may generate the response or the control command based on the inference result.

Hereinafter, various embodiments of the AI devices 100*a* to 100*e* to which the above-described technology is applied will be described. The AI devices 100*a* to 100*e* illustrated in FIG. 3 may be regarded as a specific embodiment of the AI device 100 illustrated in FIG. 1.

<AI+Robot>

The robot 100*a*, to which the AI technology is applied, may be implemented as a guide robot, a carrying robot, a cleaning robot, a wearable robot, an entertainment robot, a pet robot, an unmanned flying robot, or the like.

The robot 100*a* may include a robot control module for controlling the operation, and the robot control module may refer to a software module or a chip implementing the software module by hardware.

The robot 100*a* may acquire state information about the robot 100*a* by using sensor information acquired from various kinds of sensors, may detect (recognize) surrounding environment and objects, may generate map data, may determine the route and the travel plan, may determine the response to user interaction, or may determine the operation.

The robot 100*a* may use the sensor information acquired from at least one sensor among the lidar, the radar, and the camera so as to determine the travel route and the travel plan.

The robot 100*a* may perform the above-described operations by using the learning model provided as at least one artificial neural network. For example, the robot 100*a* may recognize the surrounding environment and the objects by using the learning model, and may determine the operation by using the recognized surrounding information or object information. The learning model may be learned directly from the robot 100*a* or may be learned from an external device such as the AI server 200.

At this time, the robot 100*a* may perform the operation by generating the result by directly using the learning model, but the sensor information may be transmitted to the external device such as the AI server 200 and the generated result may be accommodated to perform the operation.

The robot 100*a* may use at least one of the map data, the object information detected from the sensor information, or the object information acquired from the external apparatus to determine the travel route and the travel plan, and may control the driving unit such that the robot 100*a* travels along the determined travel route and travel plan.

The map data may include object identification information about various objects arranged in the space in which the robot 100*a* moves. For example, the map data may include object identification information about fixed objects such as walls and doors and movable objects such as pollen and desks. The object identification information may include a name, a type, a distance, and a position.

In addition, the robot 100*a* may perform the operation or travel by controlling the driving unit based on the control/interaction of the user. At this time, the robot 100*a* may acquire the intention information of the interaction due to the user's operation or speech utterance, and may determine the response based on the acquired intention information, and may perform the operation.

<AI+Self-Driving>

The self-driving vehicle 100*b*, to which the AI technology is applied, may be implemented as a mobile robot, a vehicle, an unmanned flying vehicle, or the like.

The self-driving vehicle 100*b* may include a self-driving control module for controlling a self-driving function, and the self-driving control module may refer to a software module or a chip implementing the software module by hardware. The self-driving control module may be included in the self-driving vehicle 100*b* as a component thereof, but may be implemented with separate hardware and connected to the outside of the self-driving vehicle 100*b*.

The self-driving vehicle 100*b* may acquire state information about the self-driving vehicle 100*b* by using sensor information acquired from various kinds of sensors, may detect (recognize) surrounding environment and objects, may generate map data, may determine the path and the travel plan, or may determine the operation.

Like the robot 100*a*, the self-driving vehicle 100*b* may use the sensor information acquired from at least one sensor among the lidar, the radar, and the camera so as to determine the travel path and the travel plan.

In particular, the self-driving vehicle 100*b* may recognize the environment or objects for an area covered by a field of view or an area over a certain distance by receiving the sensor information from external devices, or may receive directly recognized information from the external devices.

The self-driving vehicle 100*b* may perform the above-described operations by using the learning model composed of at least one artificial neural network. For example, the self-driving vehicle 100*b* may recognize the surrounding environment and the objects by using the learning model, and may determine the traveling movement line by using the recognized surrounding information or object information. The learning model may be learned directly from the self-driving vehicle 100*a* or may be learned from an external device such as the AI server 200.

In this case, the self-driving vehicle 100*b* may perform the operation by generating the result by directly using the learning model, but the sensor information may be transmitted to the external device such as the AI server 200 and the generated result may be received to perform the operation.

The self-driving vehicle 100*b* may use at least one of the map data, the object information detected from the sensor information, or the object information acquired from the external apparatus to determine the travel path and the travel plan, and may control the driving device such that the self-driving vehicle 100*b* travels along the determined travel path and travel plan.

The map data may include object identification information about various objects arranged in the space (for example, road) in which the self-driving vehicle 100*b* travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100*b* may perform the operation or travel by controlling the driving device based on the control/interaction of the user. In this case, the self-driving vehicle 100*b* may acquire the intention information of the interaction due to the user's operation or speech utterance, and may determine the response based on the acquired intention information, and may perform the operation.

<AI+XR>

The XR device 100*c*, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100*c* may analyzes three-dimensional point cloud data or image data acquired from various sensors or the external devices, generate position data and attribute data for the three-dimensional points, acquire information about the surrounding space or the real object, and render to output the XR object to be output. For example, the XR device 100*c* may output an XR object including the additional information about the recognized object in correspondence to the recognized object.

The XR device 100*c* may perform the above-described operations by using the learning model composed of at least one artificial neural network. For example, the XR device 100*c* may recognize the real object from the three-dimensional point cloud data or the image data by using the learning model, and may provide information corresponding to the recognized real object. The learning model may be directly learned from the XR device 100*c*, or may be learned from the external device such as the AI server 200.

In this case, the XR device 100*c* may perform the operation by generating the result by directly using the learning model, but the sensor information may be transmitted to the external device such as the AI server 200 and the generated result may be received to perform the operation.

<AI+Robot+Self-Driving>

The robot 100*a*, to which the AI technology and the self-driving technology are applied, may be implemented as a guide robot, a carrying robot, a cleaning robot, a wearable robot, an entertainment robot, a pet robot, an unmanned flying robot, or the like.

The robot 100*a*, to which the AI technology and the self-driving technology are applied, may refer to the robot itself having the self-driving function or the robot 100*a* interacting with the self-driving vehicle 100*b*.

The robot 100*a* having the self-driving function may collectively refer to a device that moves for itself along the given movement line without the user's control or moves for itself by determining the movement line by itself.

The robot 100*a* and the self-driving vehicle 100*b* having the self-driving function may use a common sensing method so as to determine at least one of the travel route or the travel plan. For example, the robot 100*a* and the self-driving vehicle 100*b* having the self-driving function may determine at least one of the travel route or the travel plan by using the information sensed through the lidar, the radar, and the camera.

The robot 100*a* that interacts with the self-driving vehicle 100*b* exists separately from the self-driving vehicle 100*b* and may perform operations interworking with the self-driving function of the self-driving vehicle 100*b* or interworking with the user who rides on the self-driving vehicle 100*b*.

At this time, the robot 100*a* interacting with the self-driving vehicle 100*b* may control or assist the self-driving function of the self-driving vehicle 100*b* by acquiring sensor information on behalf of the self-driving vehicle 100*b* and providing the sensor information to the self-driving vehicle 100*b*, or by acquiring sensor information, generating environment information or object information, and providing the information to the self-driving vehicle 100*b*.

Alternatively, the robot 100*a* interacting with the self-driving vehicle 100*b* may monitor the user boarding the self-driving vehicle 100*b*, or may control the function of the self-driving vehicle 100*b* through the interaction with the user. For example, when it is determined that the driver is in a drowsy state, the robot 100*a* may activate the self-driving function of the self-driving vehicle 100*b* or assist the control of the driving unit of the self-driving vehicle 100*b*. The function of the self-driving vehicle 100*b* controlled by the robot 100*a* may include not only the self-driving function but also the function provided by the navigation system or the audio system provided in the self-driving vehicle 100*b*.

Alternatively, the robot 100*a* that interacts with the self-driving vehicle 100*b* may provide information or assist the function to the self-driving vehicle 100*b* outside the self-driving vehicle 100*b*. For example, the robot 100*a* may provide traffic information including signal information and the like, such as a smart signal, to the self-driving vehicle 100*b*, and automatically connect an electric charger to a charging port by interacting with the self-driving vehicle 100*b* like an automatic electric charger of an electric vehicle.

<AI+Robot+XR>

The robot 100*a*, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100*a*, to which the XR technology is applied, may refer to a robot subjected to control/interaction in an XR image. In this case, the robot 100*a* may be separated from the XR device 100*c* and interwork with each other.

If the robot 100*a*, which is subjected to control/interaction in the XR image, may acquire the sensor information from the sensors including the camera, the robot 100*a* or the XR device 100*c* may generate the XR image based on the sensor information, and the XR device 100*c* may output the generated XR image. The robot 100*a* may operate based on the control signal input through the XR device 100*c* or the user's interaction.

For example, the user may confirm the XR image corresponding to the time point of the robot 100*a* interworking remotely through the external device such as the XR device 100*c*, adjust the self-driving travel path of the robot 100*a* through interaction, control the operation or driving, or confirm the information about the surrounding object.

<AI+Self-Driving+XR>

The self-driving vehicle 100*b*, to which the AI technology and the XR technology are applied, may be implemented as a mobile robot, a vehicle, an unmanned flying vehicle, or the like.

The self-driving vehicle 100*b*, to which the XR technology is applied, may refer to a self-driving vehicle having a means for providing an XR image or a self-driving vehicle subjected to control/interaction in an XR image. Particularly, the self-driving vehicle 100*b* In other words subjected to control/interaction in the XR image may be distinguished from the XR device 100*c* and interwork with each other.

The self-driving vehicle 100*b* having the means for providing the XR image may acquire the sensor information from the sensors including the camera and output the generated XR image based on the acquired sensor information. For example, the self-driving vehicle 100*b* may include an HUD to output an XR image, thereby providing a passenger with a real object or an XR object corresponding to an object in the screen.

In this case, if the XR object is output to the HUD, at least part of the XR object may be outputted so as to overlap the actual object to which the passenger's gaze is directed. Meanwhile, if the XR object is output to the display provided in the self-driving vehicle 100*b*, at least part of the XR object may be output so as to overlap the object in the screen. For example, the self-driving vehicle 100*b* may output XR objects corresponding to objects such as a lane, another vehicle, a traffic light, a traffic sign, a two-wheeled vehicle, a pedestrian, a building, and the like.

If the self-driving vehicle 100*b*, which is subjected to control/interaction in the XR image, may acquire the sensor information from the sensors including the camera, the self-driving vehicle 100*b* or the XR device 100*c* may generate the XR image based on the sensor information, and the XR device 100*c* may output the generated XR image. The self-driving vehicle 100*b* may operate based on the control signal input through the external device such as the XR device 100*c* or the user's interaction.

Figure 4:
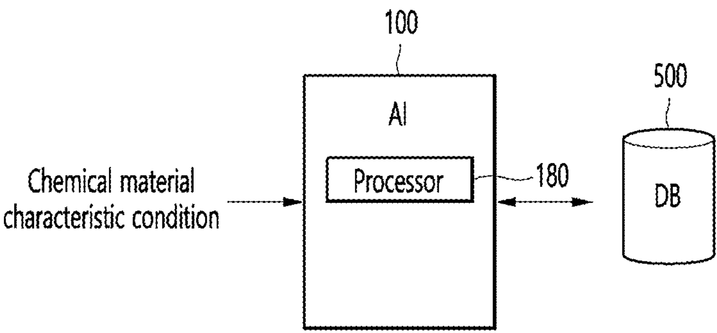
FIG. 4 is a diagram for describing operation of an artificial intelligence apparatus according to an embodiment of the present disclosure.

FIG. 4 is a diagram for describing operation of an artificial intelligence apparatus according to an embodiment of the present disclosure.

As shown in FIG. 4, an artificial intelligence device 100 of the present disclosure may include a database 500 that stores datasets of chemical materials, and a processor 180 that searches for a target material from the database 500.

Here, the database 500 may include datasets corresponding to molecular structures of chemical materials.

As an example, the dataset may include information of molecules each including at least one atom, having at least one of geometric, thermodynamic, and electronic characteristics.

The processor 180 may predict fingerprints relating to target characteristics by inputting fingerprints of the datasets into a pre-trained neural network model, extract sample data by optimizing the fingerprints relating to the target characteristics, evaluate feature importance from the extracted sample data, select high-level features on the basis of the feature importance, and search for a target material on the basis of the selected high-level features.

In this case, the processor 180 may convert the molecular structures into fingerprints by encoding the molecular structures corresponding to datasets of chemical materials into binary numbers before predicting the fingerprints for the target characteristics.

In an example, the processor 180 may convert molecular structures respectively corresponding to the datasets into fingerprints by encoding the molecular structures into a series of binary numbers indicating the presence or absence of substructures within the molecule.

The processor 180 may convert all datasets stored in the database 500 into fingerprints.

In some cases, the processor 180 may convert some of the datasets stored in the database 500 to fingerprints.

In other cases, the processor 180 may acquire datasets from an external server and convert the acquired datasets to fingerprints.

Thereafter, prior to predicting a fingerprint for a target characteristic, the processor 180 may pre-train a neural network model to predict a data characteristic corresponding to the characteristic condition based on fingerprints from training data and test data, when a characteristic condition of the chemical material to be explored is input.

Here, the characteristic condition of the chemical material may include a target characteristic of the chemical material to be explored and a target value of the target characteristic.

In an example, the characteristic condition of the chemical material may include a target characteristic that includes a HOMO-LUMO Gap when the chemical material to be explored is a luminescent material, and a target value of the HOMO-LUMO Gap.

When predicting the data characteristic corresponding to the characteristic condition, the processor 180 may calculate a distance between the HOMO-LUMO Gap value of the training data or test data and the target HOMO-LUMO Gap value, which is the target characteristic, and pre-train the neural network model to predict the data characteristic corresponding to the characteristic condition based on the calculated distance.

Further, when pre-training the neural network model, the processor 180 may set a quantity of training data and a quantity of test data to a certain ratio, collect training data and test data based on the set certain ratio, and train the neural network model using the training data and the test data.

In an example, the processor 180 may set the quantity of training data and the quantity of test data to a ratio of 9:1.

Additionally, when pre-training the neural network model, the processor 180 may pre-train the neural network model by setting the compression rate of the fingerprints to less than a threshold, and by compressing the compression rate of fingerprints of the training data to less than the pre-set threshold to reduce the dimensions.

In an example, the processor 180 may set a threshold for the compression rate of the fingerprints in the range of about 10% to about 20%.

In other words, the processor 180 may pre-train the neural network model to compress the fingerprints of the training data to less than the pre-set threshold of approximately 14%, to reduce them to two dimensions."

Next, when predicting a fingerprint for a target characteristic, the processor 180 may calculate a distance between a characteristic value of a dataset in the database 500 and a preset target characteristic value, and predict a fingerprint relating to the target characteristic based on the calculated distance.

Here, the processor 180 may predict a fingerprint closer to the target characteristic as the distance between the characteristic value of the dataset in the database 500 and the pre-set target characteristic value decreases, and predict a fingerprint farther from the target characteristic as the distance between the characteristic value of the dataset in the database 500 and the pre-set target characteristic value increases.

In an example, the processor 180 may predict a fingerprint for a target characteristic based on Equation 1 and Equation 2 below.

$$y = f_{pred} = (\Delta_{DB} - \Delta^*)^2 \quad \text{[Equation 1]}$$

$$f_{pred} = \sum_{i \neq j} Q_{ij} x_i x_j + \sum_i h_i x_i = \sum_{ij} Q_{ij} X_{ij} \quad \text{[Equation 2]}$$

In Equation 1 and Equation 2, a cost function "y" is a distance between a characteristic value of the data in the database and a target characteristic value, $\Delta_{DB}$ is a characteristic value of the data in the database, $\Delta^*$ is a target characteristic value, $f_{pred}$ is a prediction model, fingerprint $x_i$ may be 0 or 1, $X_{ij}$ may be $x_i x_j$, and $Q_{ii}$ may be $h_i$.

In an example, when a chemical material to be explored is a luminescent material, and a target characteristic including a HOMO-LUMO Gap and a target value of the HOMO-LUMO Gap are set as a characteristic condition, the processor 180 may calculate a distance between a HOMO-LUMO Gap value of a dataset in the database 500 and a preset target HOMO-LUMO Gap value, and predict a fingerprint relating to the target characteristic based on the calculated distance.

The processor 180 may predict a fingerprint relating to the target characteristic based on Equation 1 and Equation 2, wherein the cost function "y" is a distance between the HOMO-LUMO gap value of the data in the database and the target HOMO-LUMO gap value, $\Delta_{DB}$ is the HOMO-LUMO gap value of the data in the database, $\Delta^*$ is the target HOMO-LUMO gap value that is a target characteristic, $f_{pred}$ is a prediction model, fingerprint $x_i$ may be 0 or 1, $X_{ij}$ may be $x_i x_j$, and $Q_{ii}$ may be $h_i$.

The processor 180 may then extract sample data using quantum annealing.

Here, when extracting the sample data, the processor 180 may optimize the fingerprint relating to the target characteristic based on the cost function of a fingerprint prediction model, and may extract the sample data by calculating an optimized cost function based on the optimized fingerprint.

In an example, the processor 180 may optimize the fingerprint relating to the target characteristic based on Equation 3 below and calculate an optimized cost function based on Equation 4 below.

$$X^{opt} = \arg\min f_{pred}(X) \quad \text{[Equation 3]}$$

In Equation 3, $x^{opt}$ may be the optimized fingerprint, and $f_{pred}$ may be the cost function of the fingerprint prediction model.

$$E^{opt} = \min f_{pred}(x) \quad \text{[Equation 4]}$$

In equation 4, $E^{op}$ may be the optimized cost function and, $f_{pred}$ may be the cost function of a fingerprint prediction model.

The processor 180 may then calculate a relative error between the optimized cost function value $E^{op}$ and an energy value $E^*$ calculated based on the optimized fingerprint $$x_i^{opt}$$

and the coefficient $Q_i$ of the prediction model to determine the accuracy.

In an example, the processor 180 may calculate the relative error based on Equation 5 and Equation 6 below.

$$E^* = \sum Q_{ij} x_i^{opt} x_j^{opt} \quad \text{[Equation 5]}$$

In Equation 5, E* is the energy value, $$x_i^{opt}$$

is the optimized fingerprint, and $Q_i$ is the coefficient of the prediction model.

$$\delta = \frac{|E^{opt} - E^*|}{E^{opt}} = \frac{|E^{opt} - \sum Q_{ij} x_i^{opt} x_j^{opt}|}{E^{opt}} \quad \text{[Equation 6]}$$

In equation 5, δ is the relative error value between the optimized fingerprint $$x_i^{opt}$$

and the energy value E* calculated based on the coefficient $Q_i$ of the prediction model, and $E^{op}$ may be the optimized cost function value.

Further, the processor 180 may calculate the optimized cost function value $E^{op}$ as a value that is smaller than the minimum value of training data.

Further, when extracting pieces of sample data, the processor 180 may determine whether the number of pieces of sample data to be extracted is previously set, and when the number of pieces of sample data is previously set, extract the set number of pieces of sample data based on the optimized cost function.

When determining whether the number of pieces of sample data is previously set, the processor 180 may extract all sample data generated based on the optimized cost function if the number of pieces of sample data is not set.

In some cases, when determining whether the number of pieces of sample data is previously set, the processor 180 may request a user input corresponding to a setting of the number of pieces of sample data if the number of pieces of sample data is not set, and when receiving a user input corresponding to the setting of the number of pieces of sample data, extract pieces of sample data, according to the number specified by the user input.

Here, the processor 180 may extract all sample data generated based on the optimized cost function if the user input corresponding to setting of the number of sample data is not received within a predetermined time.

Next, the processor 180 may evaluate the feature importance of each fingerprint based on the frequency obtained from the sample data when evaluating the feature importance.

In this case, the processor 180 may sequentially list features in descending order of feature importance when the feature importance of each fingerprint is evaluated.

Further, when selecting high-level features, the processor 180 may determine whether a reference value for feature selection is previously set, and if the reference value for selection of the feature is previously set, select high-level features having feature importance equal to or higher than the reference value based on the set reference value.

In this case, the processor 180 may select a preset number of features belonging to high levels from the features arranged in descending order of feature importance if the reference value for selection of the feature is not set.

For example, the processor 180 may select from the first rank level feature with the highest feature importance to a certain number of rank level features corresponding to the preset number.

Thereafter, the processor 180 may search for the target material to extract molecular structures corresponding to the target material from the datasets in the database 500 based on the selected high-level features when searching for the target material.

When extracting molecular structures corresponding to a target material, the processor 180 may extract molecular structures with small hamming distances and molecular structures with large hamming distances, obtain a first common molecular structure from the molecular structures with small hamming distances, obtain a second common molecular structure from the molecular structures with large hamming distances, and obtain specific key structure information of the target characteristic for searching for the target material based on the obtained first common molecular structure and the obtained second common molecular structure.

In an example, the processor 180 may extract a preset number of molecular structures with small Hamming distances, including a molecular structure with the smallest Hamming distance, when extracting molecular structures with small Hamming distances, and a preset number of molecular structures with large Hamming distances, including a molecular structure with the largest Hamming distance, when extracting molecular structures with large Hamming distances.

In some cases, the processor 180 may extract an equal number of molecular structures with small Hamming distances and molecular structures with large Hamming distances.

As described above, by extracting sample data using quantum annealing and reducing the chemical space based on the feature importance of the material characteristic, the present disclosure may quickly and efficiently search for chemical material that meets a desired characteristic in a minimum amount of time.

FIGS. 5 to 12 are diagrams for describing a neural network model of an artificial intelligence apparatus according to an embodiment of the present disclosure.

As illustrated in FIGS. 5 to 12, when a luminescent material is selected as a chemical material to be explored, a target characteristic corresponding to the luminescent material may be selected as a HOMO-LUMO Gap.

The reason for selecting the HOMO-LUMO gap as the target characteristic corresponding to the luminescent material is that the energy value of the HOMO-LUMO gap is essential for exploring a luminescent material based on quantum chemistry.

Therefore, the present disclosure may select different target characteristics depending on chemical materials to be explored, and quickly and efficiently explore the chemical materials satisfying the desired characteristic in a minimum amount of time.

First, the present disclosure may receive a user input to select a luminescent material as a chemical material to be explored, select a HOMO-LUMO Gap as a target characteristic corresponding to the luminescent material, and select a target value of the HOMO-LUMO Gap.

The present disclosure may then convert molecular structures corresponding to datasets in the database into fingerprints.

Here, the database may include datasets corresponding to molecular structures of chemical materials, wherein each dataset may include information of molecules each composed of at least one atom and having at least one of geometrical, thermodynamic, and electronic characteristics.

The present disclosure may convert the molecular structures corresponding to the datasets of chemical materials into fingerprints by encoding the molecular structures into binary numbers.

That is, the present disclosure may convert the molecular structure corresponding to each dataset into a fingerprint by encoding the molecular structure into a series of binary numbers indicating the presence or absence of substructures within the molecule.

In this case, the present disclosure may compare fingerprints to determine the similarity between molecules and identify the matching of query substructures, or the like.

Next, the present disclosure may predict a target HOMO-LUMO gap by inputting a fingerprint from each dataset into a prediction model.

The present disclosure may calculate a cost function based on Equation 1 above.

As shown in Equation 1, the cost function "y" is the distance between the HOMO-LUMO gap value of data in the database and a target HOMO-LUMO gap value.

The cost function "y" may be expressed as a prediction model for the target HOMO-LUMO gap, as shown in Equation 2.

Furthermore, the present disclosure may set the compression rate of the fingerprints to be less than a threshold, and train the prediction model to reduce the dimensionality by performing compression to make the compression rate of fingerprints of the training data below the set threshold.

The present disclosure may set the threshold for the compression rate of fingerprints within a range of approximately 10% to 20%.

For example, the present disclosure may train the prediction model to compress the fingerprints in the training data to less than about 14% of the preset threshold to reduce the fingerprints to two dimensions.

Further, when training the prediction model, the present disclosure may set a quantity of training data and a quantity of test data to a specified ratio, collect training data and test data based on the set specified ratio, and train the prediction model using the training data and test data.

For example, the present disclosure may set the quantity of training data and the quantity of test data to a ratio of 9:1.

Figure 5:
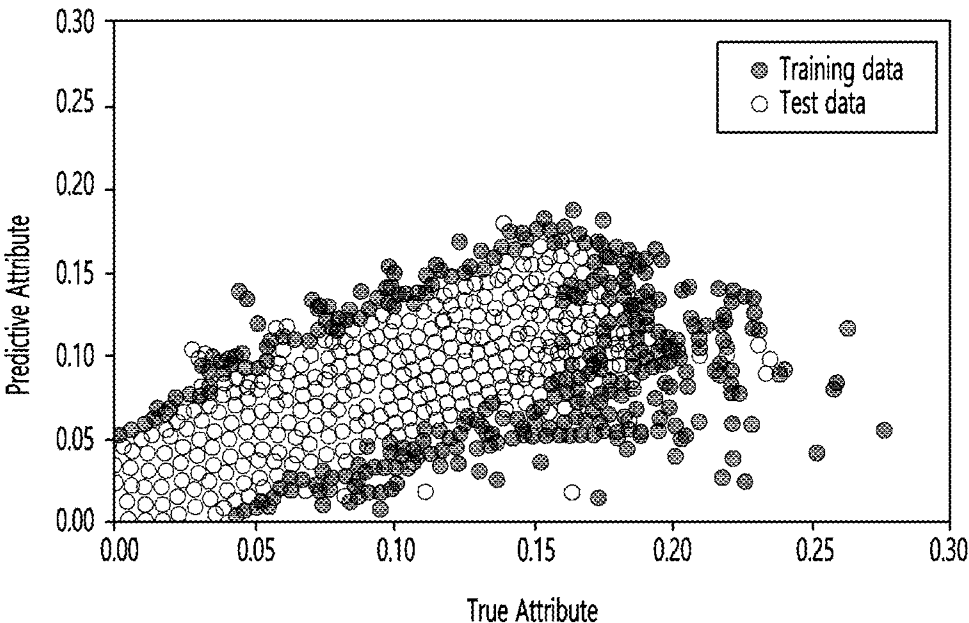
FIG. 5 to FIG. 12 are diagrams for describing a neural network model of an artificial intelligence apparatus according to an embodiment of the present disclosure.

FIG. 5 is a diagram illustrating evaluation of performance of a prediction model using fingerprints.

As shown in FIG. 5, it can be seen that when the database contains 90% training datasets and 10% test datasets, the coefficient of determination, R2 score of the training data is 0.82, and the coefficient of determination, R2 score of the test data is 0.81.

Thus, it can be seen that the prediction model of the present disclosure has good prediction performance and high accuracy.

Figure 6:
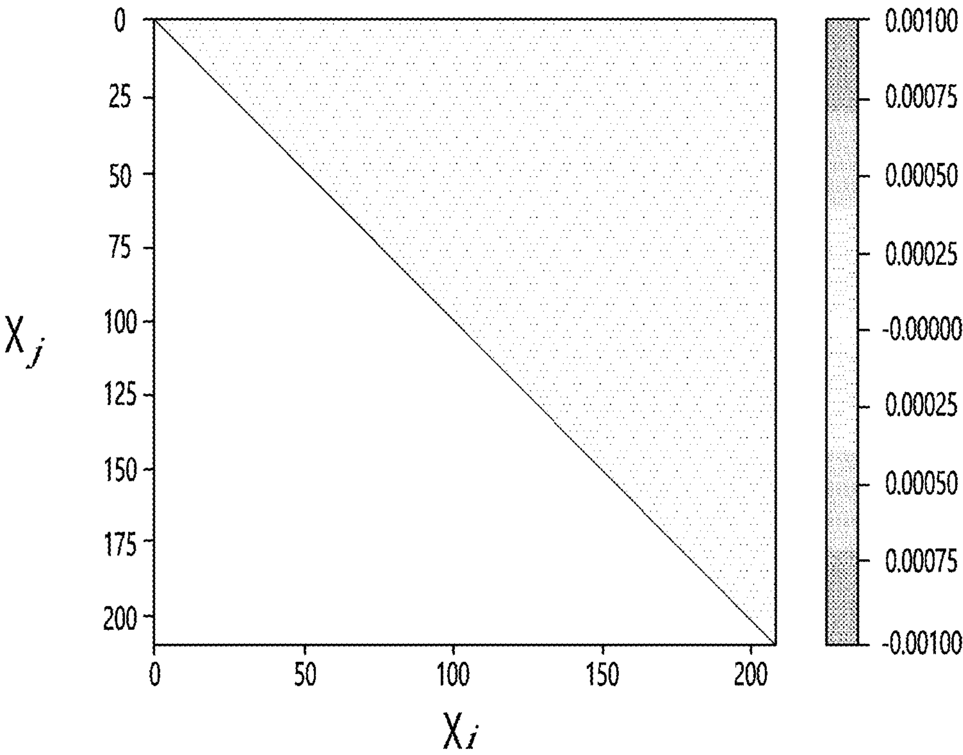

FIG. 6 is a diagram showing a coefficient in linear-quadratic form corresponding to the optimization of the prediction model.

As shown in FIG. 6, the coefficient $Q_{ij}$ of linear-quadratic form in Equation 2 above may be obtained through optimization of the prediction model.

Next, the present disclosure may obtain an optimized fingerprint that gives the lowest cost function by using quantum annealing.

The present disclosure may optimize the fingerprint based on the cost function of a fingerprint prediction model, and extract the sample data by calculating the optimized cost function based on the optimized fingerprint.

Figure 7:
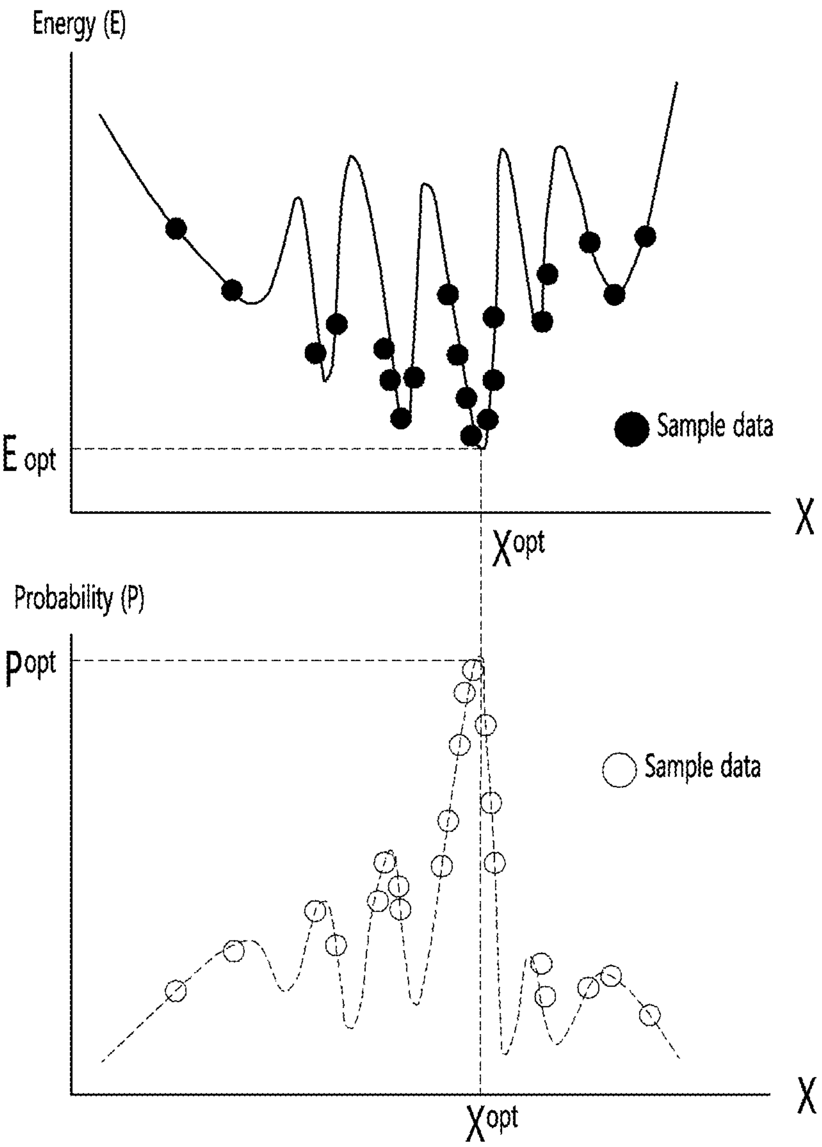

FIG. 7 is a diagram illustrating data sampling based on an optimized fingerprint and an optimized cost function.

As shown in FIG. 7, it can be seen that the probability is maximum when the energy is minimum.

In the present disclosure, low energy states may be obtained with the fingerprint by quantum annealing.

The present disclosure may then calculate a relative error value δ between the optimized fingerprint $$x_i^{opt}$$

and the energy value E* calculated based on the coefficient $Q_i$ of the prediction model, as shown in Equation 6.

In an example, the experimental results of the present disclosure show that the relative error value is about $7.51\times10^{-15}$, which shows a high accuracy.

In another example, the optimized cost function value is about $9.99\times10^{-5}$, which is smaller than the minimum value of the training data.

Subsequently, the present disclosure may evaluate feature importance from the extracted sample data and select high-level features based on the feature importance.

Figure 8:
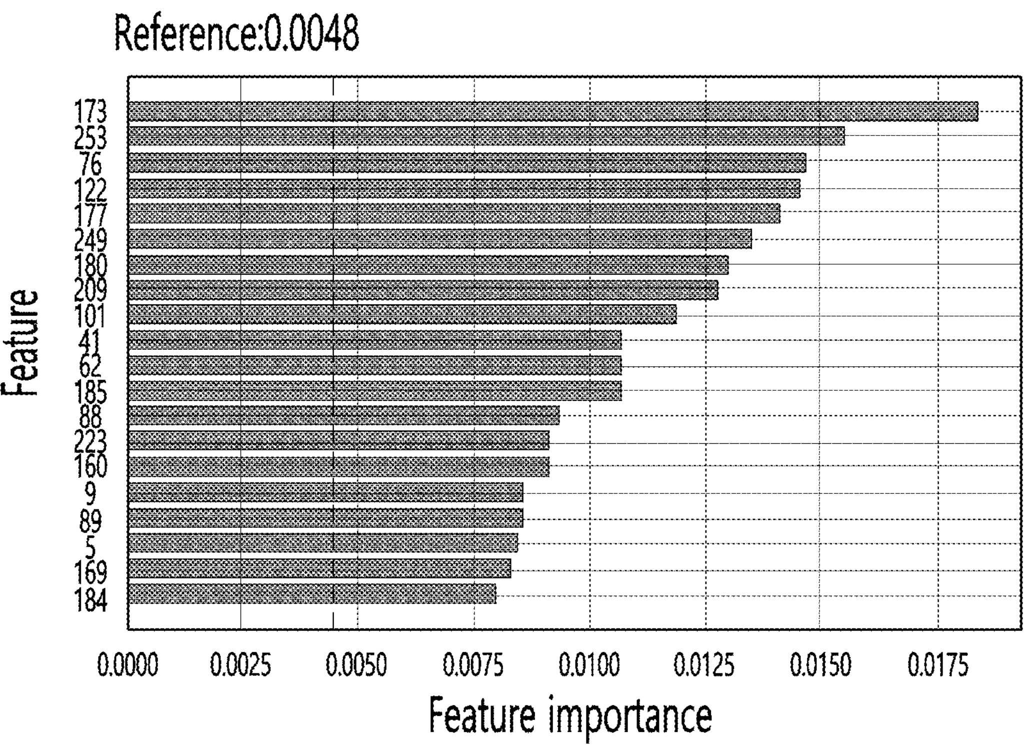

FIG. 8 illustrates the evaluation of feature importance of sample data.

As shown in FIG. 8, the present disclosure may extract approximately 1,000 sample data points and evaluate the feature importance of the fingerprint of each sample data.

In this process, the present disclosure may evaluate the feature importance of each fingerprint based on the frequency obtained from the sample data.

Further, the present disclosure may sequentially list features in descending order of feature importance when the feature importance of each fingerprint is evaluated.

The present disclosure may select the top 20 levels of feature importance.

For example, when selecting high-level features, the present disclosure may select high-level features having a feature importance based on a reference value of about 0.0048 for feature selection.

Next, the present disclosure may extract molecular structures corresponding to the luminescent material from the datasets in the database based on the selected high-level features.

Figure 9:
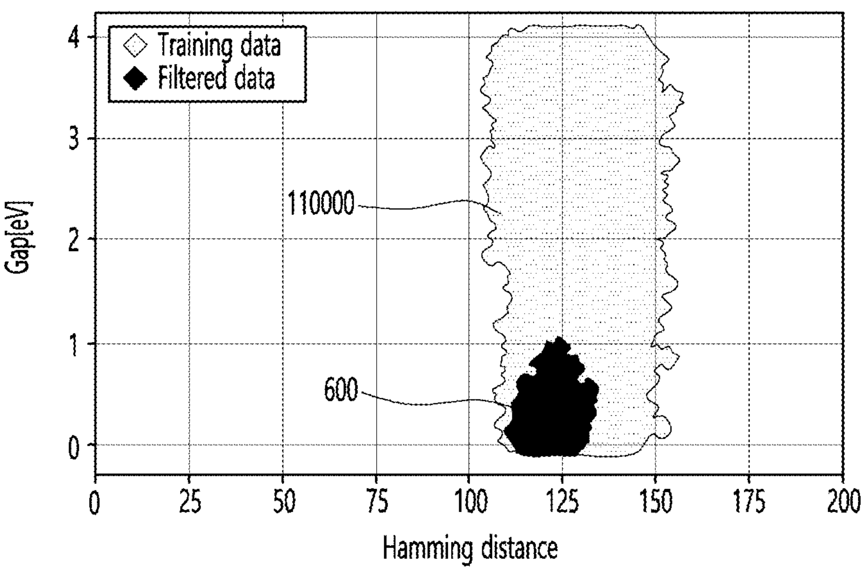

FIG. 9 is a diagram illustrating the extraction of molecular structure features of a luminescent material based on high-level features.

As shown in FIG. 9, the present disclosure may extract filtered data, that is, about 600 molecular structures by filtering 110000 training data through fingerprints of higher level of feature importance.

In other words, the present disclosure may extract approximately 600 molecular structures with small distances from the target HOMO-LUMO gap using the fingerprints with high levels of feature importance.

Here, the present disclosure may refer to optimized fingerprints to determine whether feature importance is used as 0 or 1.

Thus, the present disclosure may enable the screening of the search space for luminescent materials to approximately 0.5% (−600/110,000), providing the effect of virtual screening based on quantum annealing.

Figure 10:
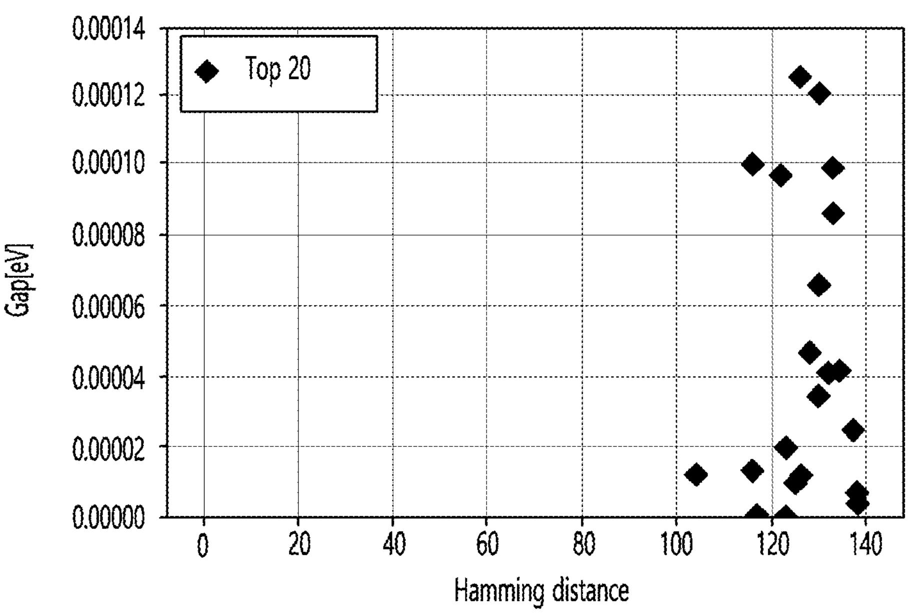
Figure 11:
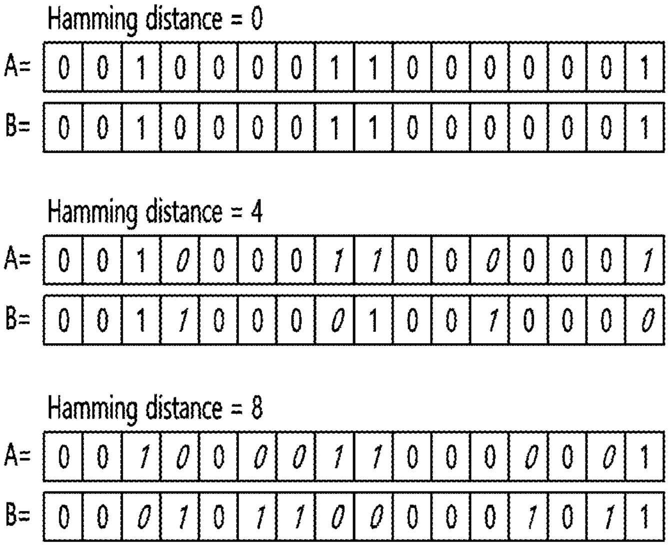

FIG. 10 is a diagram illustrating Hamming distances for fingerprints with high-level feature importance, and FIG. 11 is a diagram for describing similarity of molecular structures based on Hamming distances.

As shown in FIG. 10, fingerprints at high levels of feature importance may be similar because the Homo-Lomo gap is small and the Hamming distance difference between them is not large.

As shown in FIG. 11, a hamming distance may be determined to be the number of bits having different values (0 or 1) between molecular structure A and molecular structure B.

Here, the molecular structures may be more similar the smaller the Hamming distance between the molecular structures.

For example, when there are molecular structures A, B, C, and D, molecular structure A and molecular structure B may have a Hamming distance of "0" between them because their bit sequences are identical, molecular structure A and molecular structure C may have a Hamming distance of "4" between them because their bit sequences have 4 different values, and molecular structure A and molecular structure D may have a Hamming distance of "8" between them because their bit sequences have 8 different values.

Thus, molecular structure A may have the highest similarity to molecular structure B and the lowest similarity to molecular structure D, and the similarity to molecular structure C may be higher than the similarity to molecular structure D and lower than the similarity to molecular structure B.

Then, when extracting molecular structures corresponding to luminescent material, the present disclosure may extract molecular structures with small hamming distances and molecular structures with large hamming distances, obtain a first common molecular structure from the molecular structures with small hamming distances, obtain a second common molecular structure from the molecular structures with large hamming distances, and obtain specific key structure information of a HOMO-LUMO gap for searching for the luminescent material based on the obtained first common molecular structure and the obtained second common molecular structure.

In an example, the present disclosure may extract a preset number of molecular structures with small Hamming distances, including a molecular structure with the smallest Hamming distance, when extracting molecular structures with small Hamming distances, and a preset number of molecular structures with large Hamming distances, including a molecular structure with the largest Hamming distance, when extracting molecular structures with large Hamming distances.

Figure 12:
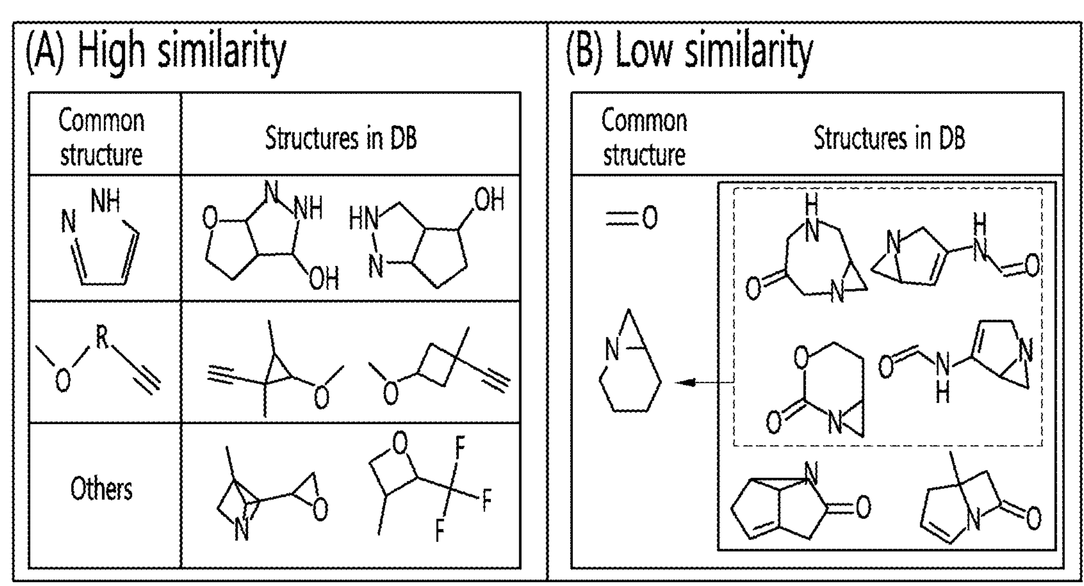

FIG. 12 is a diagram illustrating obtaining a common molecular structure from high-similarity molecular structures with small Hamming distances and low-similarity molecular structures with large Hamming distances.

As shown in FIG. 12, the present disclosure may efficiently extract six molecular structures with small Hamming distance and high similarity and six molecular structures with large Hamming distance and low similarity in a short time in such a way to reduce and screen a chemical space by narrowing a search range based on high-level features.

Here, the disclosure may analyze that common molecular structures, an indole-type structure and an acetylene-type structure, obtained from the six molecular structures with small Hamming distance and high similarity, are important factors in obtaining the target HOMO-LUMO gap.

Thus, the present disclosure may understand the specific key structure of the HOMO-LUMO gap, such as common molecular structures, for searching for luminescent material, and establish molecular design guidelines in consideration of fesibility of synthesis.

Figure 13:
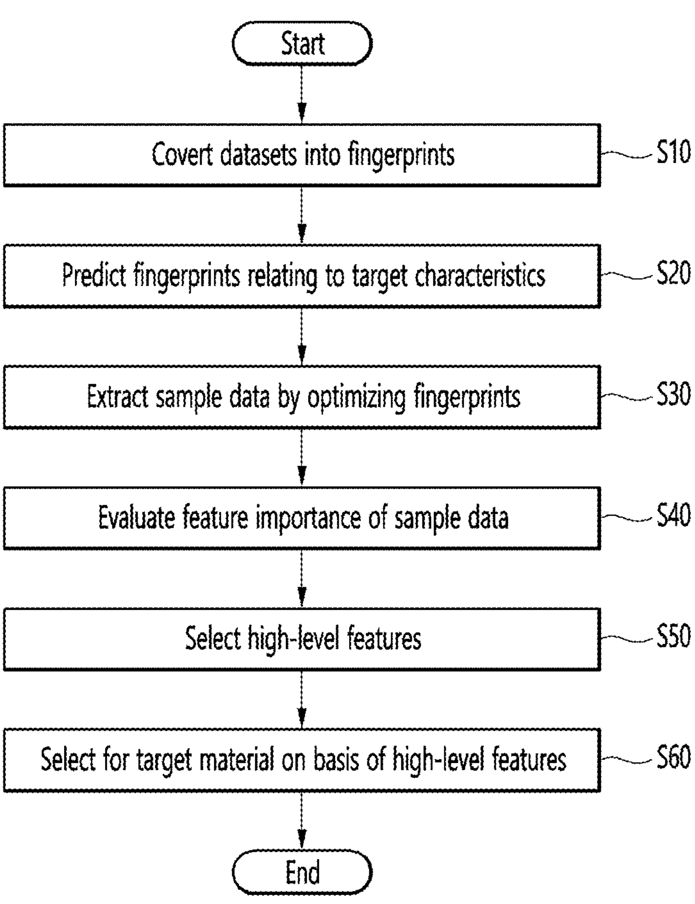
FIG. 13 is a diagram for describing a process of searching for a chemical material in an artificial intelligence apparatus according to an embodiment of the present disclosure.

FIG. 13 is a diagram for describing operation of searching for a chemical material in an artificial intelligence apparatus according to an embodiment of the present disclosure.

As shown in FIG. 13, first, the present disclosure may convert datasets of chemical materials into fingerprints (S10).

Here, the present disclosure may convert the molecular structures respectively corresponding to the datasets into fingerprints by encoding the molecular structures into a series of binary numbers indicating the presence or absence of substructures within the molecule.

Next, the present disclosure may predict a fingerprint relating to a target characteristic by inputting the fingerprints of the datasets into a pre-trained neural network model (S20).

In this case, the present disclosure may pre-train the neural network model to predict a data characteristic corresponding to a characteristic condition based on fingerprints of training data and test data when the characteristic condition of the chemical material to be explored is input.

In an example, the characteristic condition of the chemical material may include a target characteristic of the chemical material to be explored and a target value of the target characteristic.

The present disclosure may calculate a distance between a characteristic value of a dataset in the database 500 and a preset target characteristic value, and predict a fingerprint relating to the target characteristic based on the calculated distance.

In this case, the present disclosure may predict a fingerprint closer to the target characteristic as the distance between the characteristic value of the dataset in the database and the pre-set target characteristic value decreases, and predict a fingerprint farther from the target characteristic as the distance between the characteristic value of the dataset in the database and the pre-set target characteristic value increases.

Thereafter, the present disclosure may optimize the fingerprint relating to the target characteristic to extract sample data (S30).

Here, the present disclosure may extract the sample data by using quantum annealing.

The present disclosure may optimize the fingerprint relating to the target characteristic based on the cost function of a fingerprint prediction model, and extract the sample data by calculating the optimized cost function based on the optimized fingerprint.

The present disclosure may evaluate feature importance from the extracted sample data (S40).

In this case, the present disclosure may evaluate the feature importance of each fingerprint from the frequency obtained from the sample data.

Further, the present disclosure may sequentially list features in descending order of feature importance when the feature importance of each fingerprint is evaluated.

Thereafter, the present disclosure may select high levels of features based on the feature importance (S50).

In this case, the present disclosure may determine whether a reference value for feature selection is previously set, and if the reference value for feature selection is previously set, the processor 180 may select high-level features having feature importance equal to or higher than the reference value based on the set reference value.

Subsequently, the present disclosure may search for the target material based on the selected high-level features (S60).

In this case, the present disclosure may search for the target material to extract molecular structures corresponding to the target material from the datasets in the database based on the selected high-level features when searching for the target material.

As an example, the present disclosure may extract molecular structures with small hamming distances and molecular structures with large hamming distances, obtain a first common molecular structure from the molecular structures with small hamming distances, obtain a second common molecular structure from the molecular structures with large hamming distances, and obtain specific key structure information of a HOMO-LUMO gap for searching for the luminescent material based on the obtained first common molecular structure and the obtained second common molecular structure.

As described above, by extracting sample data using quantum annealing and reducing the chemical space based on the feature importance of the material characteristic, the present disclosure may quickly and efficiently search for chemical material that meets a desired characteristic in a minimum amount of time.

The artificial intelligence apparatus according to the present disclosure may include a quantum computer including a quantum processor.

The present disclosure may rapidly sample large amounts of data by performing optimization of combination through annealing-based quantum computing, extract high-level features from the sampling data, and reduce and screen a chemical space based on the features, enabling the rapid and efficient creation of new chemical materials through the development of chemical materials concentrated in the screened and reduced space.

In other words, the present disclosure relates to a novel approach for screening a chemical space.

Traditionally, due to the difficulty of generating data across the entire chemical space, there was an issue of inefficiency in random search for data generation.

As a result of the above issue, the extraction of effective factors (importance of feature quantity) and dimensionality reduction is necessary. However, when using classical computational methods such as Principal Component Analysis (PCA) to screen a vast space, the issue of requiring an extensive amount of computational time arises.

However, by interpreting the feature quantity based on the sampling data by annealing-based quantum computing, as shown in steps S30 and S40 of FIG. 13, the present disclosure enables sampling of low-energy combinations at a high speed of about μsec in a large number of about 10,000 cases by utilizing the features via annealing-based quantum computing.

As an example, as shown in FIG. 7, the present disclosure may utilize a sampling machine based on physical laws (Gibbs-Boltzmann distribution: a function of energy).

In this way, conventional classical computers faced significant challenges in sampling for feature quantity interpretation, such as data being skewed within a specific range or requiring excessive sampling time. However, as illustrated in FIG. 8, the present disclosure extracts the top 20 feature quantities at the highest levels and screens the chemical space, enabling the reduction of the chemical space to less than approximately 1% of the entire chemical space, as shown in FIG. 9.

The present disclosure may rapidly sample large amounts of data by performing optimization of combination through annealing-based quantum computing, extract high-level features from the sampling data, and reduce and screen a chemical space based on the features, enabling the rapid and efficient creation of new chemical materials through the development of chemical materials concentrated in the screened and reduced space.

The present disclosure described above may be embodied as computer readable codes on a medium in which a program is recorded. The computer-readable medium includes all kinds of recording devices in which data readable by a computer system is stored. Examples of the computer readable medium may include a hard disk drive (HDD), a solid state disk (SSD), a silicon disk drive (SDD), a ROM, a RAM, a CD-ROM, a magnetic tape, a floppy disk, an optical data storage device, and the like. The computer may also include the processor 180 of an artificial intelligence device.

INDUSTRIAL APPLICABILITY

According to the artificial intelligence apparatus according to the present disclosure extracts sample data using the quantum annealing and reduces the chemical space based on the feature importance of the material characteristics, quickly and efficiently searching for chemical materials satisfying desired characteristics in a minimal amount of time, and thus achieving remarkable industrial applicability.

What is claimed is:

1. An artificial intelligence apparatus comprising:
- a database configured to store datasets of chemical materials; and
- a quantum processor (QPU) configured to execute quantum annealing to obtain low energy states of fingerprint; and
- a processor configured to search for a target material from the database, and wherein the processor is configured to:
  - predict a fingerprint relating to a target characteristic by inputting fingerprints of the datasets into a pre-trained neural network model,
  - extract sample data using the quantum annealing executed by the QPU by:
    - (i) optimizing the fingerprint relating to the target characteristic based on a cost function of a fingerprint prediction model expressed in a linear-quadratic form to obtain an optimized fingerprint that gives the lowest cost function; and
    - (ii) calculate an optimized cost function based on the optimized fingerprint;
  - evaluate a feature importance from the extracted sample data;
  - select high-level features based on the feature importance;
  - search for the target material by extracting molecular structures corresponding to the target material from the datasets in the database based on the selected high-level features;

wherein the extracting of the molecular structures comprises:

extract a preset number of molecular structures with small Hamming distances, including a molecular structure with the smallest Hamming distance; and extract a preset number of molecular structures with large Hamming distances, including a molecular structure have the largest Hamming distance;

obtain a first common molecular structure from the extracted molecular structures with the smallest Hamming distances;

obtain a second common molecular structure from the extracted molecular structures with the largest Hamming distances; and obtain specific key structure information of the target characteristic for searching for the target material based on the obtained first common molecular structure and the obtained second common molecular structure.

2. The artificial intelligence apparatus of claim 1, wherein the processor is configured to convert molecular structures corresponding to the datasets of the chemical materials into the fingerprints by encoding the molecular structures into binary numbers before predicting the fingerprint relating to the target characteristic.

3. The artificial intelligence apparatus of claim 1, wherein the processor is configured to, when a characteristic condition of a chemical material to be explored is input, pre-train the neural network model to predict a data characteristic corresponding to the characteristic condition based on fingerprints of training data and test data, before predicting the fingerprint relating to the target characteristic.

4. The artificial intelligence apparatus of claim 3, wherein the characteristic condition for the chemical materials includes the target characteristic of the chemical material to be explored and a target value of the target characteristic.

5. The artificial intelligence apparatus of claim 1, wherein the processor is configured to, when predicting the fingerprint relating to the target characteristic, calculate a distance between a characteristic value of a dataset in the database and a preset target characteristic value, and predict the fingerprint relating to the target characteristic based on the calculated distance.

6. The artificial intelligence apparatus of claim 5, wherein the processor is configured to predict a fingerprint closer to the target characteristic as the distance between the characteristic value of the dataset in the database and the pre-set target characteristic value decreases; and predict a fingerprint farther from the target characteristic as the distance between the characteristic value of the dataset in the database and the pre-set target characteristic value increases.

7. The artificial intelligence apparatus of claim 1, wherein the processor is configured to, when evaluating the feature importance, evaluate a feature importance of each fingerprint from frequency obtained from the sample data.

8. The artificial intelligence apparatus of claim 1, wherein the processor is configured to determine whether a reference value for selection of the feature is previously set, and if the reference value for selection of the feature is previously set, select high-level features having feature importance equal to or higher than the reference value based on the pre-set reference value, when selecting the high-level features.

9. The artificial intelligence apparatus of claim 8, wherein the processor is configured to select a preset number of features belonging to high levels from features arranged in descending order of feature importance if the reference value for selection of the feature is not set.

10. A non-transitory computer-readable storage medium having instructions stored thereon, when executed by a processor, cause the processor to execute a method of searching a chemical material in an artificial intelligence (AI) apparatus, the AI apparatus comprising:

a database configured to store datasets of chemical materials;

a quantum processor (QPU) configured to execute quantum annealing to obtain low energy states of a fingerprint; and the processor configured to search for the target material from the database, wherein the processor is configured to:

predict a fingerprint relating to a target characteristic by inputting fingerprints of the datasets into a pre-trained neural network model;

extract sample data using the quantum annealing executed by the QPU by: (i) optimizing the fingerprint relating to the target characteristic based on a cost function of a fingerprint prediction model expressed in a linear-quadratic form to obtain an optimized fingerprint that gives the lowest cost function; and (ii) calculating an optimized cost function based on the optimized fingerprint;

evaluate a feature importance from the extracted sample data;

select high-level features based on the feature importance;

search for the target material by extracting molecular structures corresponding to the target material from the datasets in the database based on the selected high-level features;

wherein the extracting of the molecular structures comprises:

extract a preset number of molecular structures with small Hamming distances, including a molecular structure with the smallest Hamming distance; and extract a preset number of molecular structures with large Hamming distances, including a molecular structure have the largest Hamming distance;

obtain a first common molecular structure from the extracted molecular structures with the smallest Hamming distances;

obtain a second common molecular structure from the extracted molecular structures with the largest Hamming distances; and obtain specific key structure information of the target characteristic for searching for the target material based on the obtained first common molecular structure and the obtained second common molecular structure.

11. A method of searching a chemical material in an artificial intelligence (AI) apparatus, the AI apparatus comprising:

a database configured to store datasets of chemical materials;

a quantum processor (QPU) configured to execute quantum annealing to obtain low energy states of a fingerprint; and the method for searching the chemical material in the database, comprising:

predicting a fingerprint relating to a target characteristic by inputting fingerprints of the datasets into a pre-trained neural network model;

extracting sample data using quantum annealing executed by the QPU by:

(i) optimizing the fingerprint relating to the target characteristic based on a cost function of a fingerprint prediction model expressed in a linear-quadratic form to obtain an optimized fingerprint that gives the lowest cost function; and (ii) calculating an optimized cost function based on the optimized fingerprint;

evaluating a feature importance from the extracted sample data;

selecting high-level features based on the feature importance;

searching for the target material by extracting molecular structures corresponding to the target material from the datasets in the database based on the selected high-level features;

wherein the extracting of the molecular structures comprises:

extracting a preset number of molecular structures with small Hamming distances, including a molecular structure with the smallest Hamming distance; and extracting a preset number of molecular structures with large Hamming distances, including a molecular structure have the largest Hamming distance;

obtaining a first common molecular structure from the extracted molecular structures with the smallest Hamming distances;

obtaining a second common molecular structure from the extracted molecular structures with the largest Hamming distances; and obtaining specific key structure information of the target characteristic for searching for the target material based on the obtained first common molecular structure and the obtained second common molecular structure.

* * * * *